(12) United States Patent
Proepper et al.

(10) Patent No.: US 9,255,684 B2
(45) Date of Patent: Feb. 9, 2016

(54) MOTOR VEHICLE COMPONENT WITH MOUNTING CLIP

(71) Applicant: GM GLOBAL TECHNOLOGY OPERATIONS LLC, Detroit, MI (US)

(72) Inventors: Serkan Proepper, Weiler bei Bingen (DE); Heiko Eckert, Bingen-Buedesheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 71 days.

(21) Appl. No.: 13/917,705

(22) Filed: Jun. 14, 2013

(65) Prior Publication Data

US 2013/0335991 A1    Dec. 19, 2013

(30) Foreign Application Priority Data

Jun. 14, 2012    (DE) .................. 10 2012 011 856

(51) Int. Cl.
*F21V 7/04* (2006.01)
*F21S 8/10* (2006.01)
*B60Q 1/26* (2006.01)

(52) U.S. Cl.
CPC ............ *F21S 48/255* (2013.01); *B60Q 1/2623* (2013.01)

(58) Field of Classification Search
CPC ........... F21S 8/00; F21B 2/243; G08G 1/167; B60Q 1/2665; B60Q 1/0441; B60Q 1/2638; B60Q 1/2615; B60Q 1/263; B60R 1/081; B60R 1/0212

USPC .......... 362/549, 523, 540, 494, 528; 180/219, 180/229, 280; 296/37, 63, 30
See application file for complete search history.

(56) References Cited

U.S. PATENT DOCUMENTS

| | | | |
|---|---|---|---|
| 4,488,206 A | 12/1984 | Mizusawa | |
| 4,729,072 A * | 3/1988 | Oroza | 362/517 |
| 6,019,487 A * | 2/2000 | Fornell | 362/368 |
| 6,190,030 B1 * | 2/2001 | Chase | 362/549 |
| 6,203,240 B1 * | 3/2001 | Hironaka et al. | 403/397 |
| 2005/0260060 A1 * | 11/2005 | Zoubek et al. | 411/508 |
| 2010/0025547 A1 * | 2/2010 | Smutny et al. | 248/27.3 |

FOREIGN PATENT DOCUMENTS

| | | |
|---|---|---|
| DE | 1929895 U | 12/1965 |
| DE | 2522629 A1 | 12/1976 |
| DE | 8202901 U1 | 6/1982 |
| DE | 3538682 C1 | 4/1987 |
| DE | 19811420 A1 | 9/1999 |
| DE | 202009012129 U1 | 2/2011 |

* cited by examiner

*Primary Examiner* — Sean Gramling
*Assistant Examiner* — Omar Rojas Cadima
(74) *Attorney, Agent, or Firm* — Ingrassia Fisher & Lorenz PC

(57) ABSTRACT

A motor vehicle component is provided, in particular turn signal lamp, having a clip for mounting to edges of motor vehicle supports, in particular fenders, having different wall thicknesses, wherein the clip has a first mounting face, which is provided for mounting to an edge having a first wall thickness, and a second mounting face, which is stepped with respect to this, which is provided for mounting to an edge having a second wall thickness that is different.

20 Claims, 4 Drawing Sheets

MOTOR VEHICLE COMPONENT WITH MOUNTING CLIP

CROSS-REFERENCE TO RELATED APPLICATION

This application claims priority to German Patent Application No. 10 2012 011 856.2, filed Jun. 14, 2012, which is incorporated herein by reference in its entirety.

TECHNICAL FIELD

The technical field relates to a motor vehicle component, in particular a turn signal lamp, having a clip for mounting to edges of motor vehicle supports, in particular fenders, with different wall thicknesses, to a motor vehicle support, which is designed for mounting such a motor vehicle component, to a motor vehicle and a mounting arrangement having such a motor vehicle component and to a method for mounting such a motor vehicle component.

BACKGROUND

A clip mounting, in which a clip on insertion is elastically deformed, securing a component through a positive or frictional connection, is usually matched to a certain wall thickness of the support. In particular, when supports are embodied of different materials, the support wall thicknesses however can vary greatly. Thus, the wall thickness of a metal fender can be approximately 0.7 mm, that of a plastic fender 2.7 mm. Now, if for example an additional turn signal lamp is to be mounted on the fender, two different additional turn signal lamps have to be provided up to now, clip mountings of which are matched to the different wall thicknesses. Disadvantageously, this increases the manufacturing, storage and assembly effort.

Therefore, at least one object is to improve the mounting of a motor vehicle component to a motor vehicle support. Furthermore, other objects, desirable features, and characteristics will become apparent from the subsequent summary and detailed description, and the appended claims, taken in conjunction with the accompanying drawings and this background.

SUMMARY

According to an embodiment, a motor vehicle component, in particular an (additional) turn signal lamp or a part of such, comprises at least one clip for the in particular non-destructively detachable mounting to an edge of a motor vehicle support, in particular of a fender. As is usual in this field, a clip in this case is to mean in particular an elastically formed structure, which is provided or suitably designed to be elastically deformed for the mounting and to wholly or partly relax again preferentially in a mounted or end position.

The clip comprises a first mounting face, which is provided or equipped for mounting to an edge of a motor vehicle support having a first wall thickness, and a second mounting face which is stepped with respect to this, which is provided or equipped for mounting to an edge of a motor vehicle support having a second wall thickness that is different from this. Additionally, the clip can comprise one or a plurality of further mounting faces, which are provided for mounting to edges of motor vehicle supports having one or a plurality of further wall thicknesses. Another mounting face that is stepped with respect to a mounting face can be offset with respect to the one mounting face in an insertion direction of the motor vehicle component and/or perpendicularly thereto. An insertion direction in particular can be a direction in which the clip for mounting is guided past the edge, in particular a perpendicular bisector between two legs of a clip. Equally, an insertion direction can be oriented perpendicularly to a main deformation direction of the clip and/or perpendicularly to an opening of the motor vehicle support defining the edge, so that another mounting face which is stepped with respect to a mounting face can be offset with respect to the one mounting face in particular in a main deformation direction of the clip and/or perpendicularly thereto. Between a mounting face and another mounting face which is stepped with respect thereto, a shoulder can be formed in particular.

The same motor vehicle component can be advantageously mounted on edges of motor vehicle supports having different wall thicknesses: for mounting to an edge having a first wall thickness, the first mounting face of the clip is brought into contact with this edge and clipped together, for mounting to an edge having a second wall thickness, the second mounting face of the clip. Because of this, diversification effort in particular can be reduced.

A clip can secure the motor vehicle component in particular on an edge. For mounting to an edge located opposite, a further clip can be arranged with a first and a second mounting face which is stepped with respect to this. Equally, for mounting to an edge located opposite, an in particular solid or rigid abutment arrangement having a first mounting face, which is provided or equipped for mounting to an edge having the first wall thickness and a second mounting face which is stepped with respect to this, can be arranged, which is provided or equipped for mounting to an edge having the second wall thickness. If the clip has three or more mounting faces which are provided for mounting two edges having different wall thicknesses, the abutment arrangement can accordingly also have three or more mounting faces, which are provided for mounting two edges having different wall thicknesses. In a further development, mounting faces, which are provided for mounting to edges having different wall thicknesses, are laterally offset with respect to one another so that they—seen in insertion direction—are located next to one another.

One or a plurality of mounting faces of a clip and/or of an abutment arrangement can each have a stop face for positively connected mounting. A stop face is equipped in order to engage, seen in insertion direction, behind an edge of the motor vehicle support, thus locking or securing the motor vehicle component in a positively connected manner against a movement opposite the insertion direction. In order to still make possible releasing the motor vehicle component under a correspondingly increased disassembly force and/or to center the motor vehicle component between edges of the motor vehicle support, the stop face in a further development can be beveled in a release direction, which is opposite to the insertion direction. Beveling in release direction can bring about in particular an elastic deformation of a clip when being subjected to a disassembly force in release direction, which releases the motor vehicle component. Stop faces, which are provided for mounting to opposite edges, can be arrow-shaped in particular in release direction.

Additionally or alternatively to a positively connected mounting, a frictionally connected mounting, in particular subject to preloading a clip against an abutment arrangement, can be provided. In an embodiment, one or a plurality of mounting faces of a clip and/or of an abutment arrangement each have a friction face for the frictional connection mounting. The friction face can in particular, at least substantially, be parallel to the insertion direction, and/or oriented so that with mounted motor vehicle component, in particular with elastically deformed clip, it is at least substantially parallel to an inner face of an edge of the motor vehicle support.

If a clip or an abutment arrangement comprises a stop face and a friction face, these can be angled with respect to one another in an embodiment, in particular in order to represent the beveling of the stop face explained above and/or parallelism of the friction face with respect to the inner face of an edge.

Two or more mounting faces which are stepped with respect to one another can merge into one another in particular in a shoulder. In particular, a stop face of a mounting face can merge into a friction face, which is angled with respect to this, of a neighboring mounting face which is stepped with respect to this. In an embodiment, a friction face of a mounting face can be stepped or set back with respect to an outside of the leg of the clip, in particular through a stop face of this mounting face. In an embodiment, the clip, in particular a leg of the clip, can comprise two or more steps preferentially at its free end, which define a first mounting face and a second mounting face stepped with respect to this and if applicable, further mounting faces which are stepped with respect to this.

In an embodiment, the motor vehicle component comprises a counterface for abutment against an edge of the motor vehicle support in particular in insertion direction located opposite a stop face of a clip and/or of an abutment arrangement. If the motor vehicle support in an embodiment comprises a through-opening, to the edge of which the motor vehicle component is mounted, the counterface in a further development extends beyond this edge of the through-opening. On a counterface, a seal, in particular an elastic seal, can be arranged. In an embodiment, a clear width between a counterface and a stop face of a first mounting face of a clip and/or of an abutment arrangement is smaller than a clear width between the counterface and a stop face of a second mounting face of the clip or the abutment arrangement, wherein the clear width can be measured in particular in insertion direction and/or with undeformed clip.

As explained on the introductory example, different motor vehicle support wall thicknesses occur in particular as a result of different motor vehicle support materials, in particular metal on the one hand and plastic on the other hand. The first wall thickness, in an embodiment, is therefore smaller than approximately 1.5 mm, in particular smaller than approximately 1 mm, preferentially smaller than approximately 0.8 mm. Additionally or alternatively, the second wall thickness can be greater than approximately 1.5 mm, in particular greater than approximately 2 mm, preferentially greater than approximately 2.5 mm.

The clip can comprise an at least substantially U-shaped cross section having two legs. The first and second mounting face are arranged on a leg. Here, a U-shaped cross section is to also mean a V-shaped cross section for the more compact representation, generalized all cross sections having two legs which, if applicable by way of a center web, are interconnected in order to realize elasticity. In a further development, the clip can comprise a rib in order to adjust its stiffness or elasticity.

In particular, if the motor vehicle component has a rigid abutment arrangement with mounting faces that are laterally offset with respect to one another and stepped with respect to one another, a motor vehicle support with a greater wall thickness can comprise an edge for mounting the abutment arrangement, which comprises one or a plurality of recesses for receiving mounting faces, which are provided for mounting to smaller wall thicknesses.

For mounting a motor vehicle component according to an embodiment, this can also be inserted through an edge of a motor vehicle support. This is to mean in particular a guiding past an edge of a through-opening of the motor vehicle support. In particular, an abutment arrangement can be initially hooked into an edge of the motor vehicle support and subsequently the motor vehicle component pivoted about this abutment arrangement. In the process, the clip or clips of the motor vehicle component are clipped together with the edge of the motor vehicle support.

According to an embodiment, a mounting arrangement of a first motor vehicle support having an edge with a first wall thickness and a second motor vehicle support having an edge with a second wall thickness that is different. A first or second mounting face of a clip and/or of an abutment arrangement of a motor vehicle component is mounted or can be optionally mounted on the first or second edge, in particular non-destructively releasably.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background of the invention or the following detailed description.

Figure 1A:
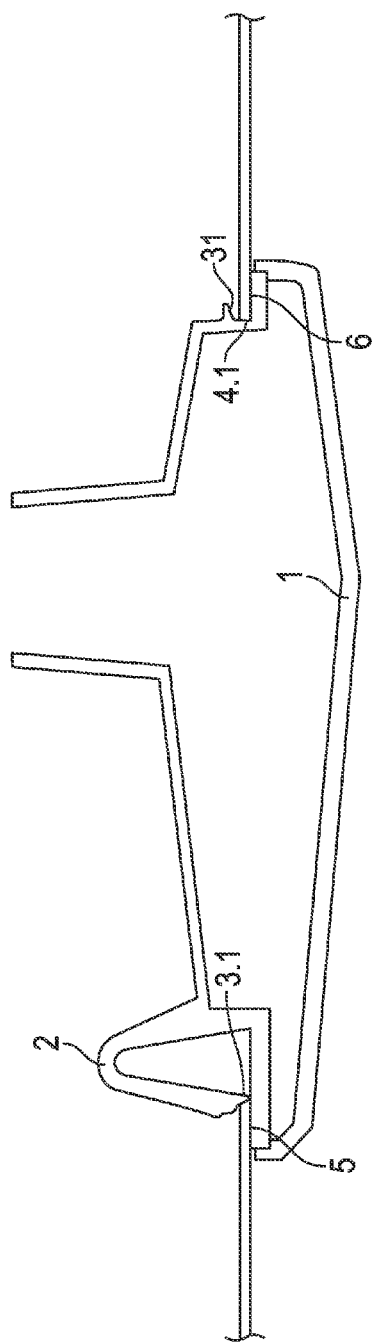
FIG. 1A is a fender of a smaller wall thickness with an additional turn signal lamp mounted thereon according to an embodiment in a section according to FIG. 2A.
Figure 1B:
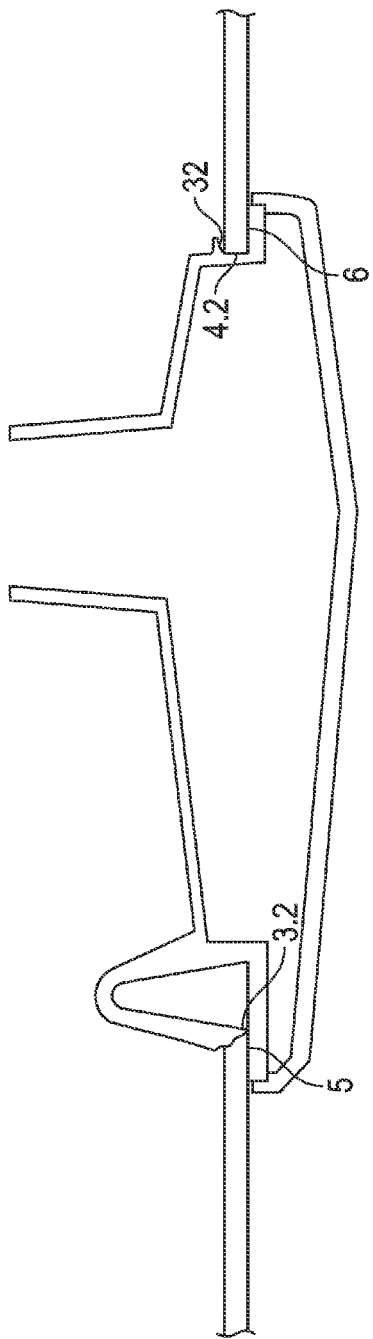
FIG. 1B is a fender of a greater wall thickness with the additional turn signal lamp according to FIG. 1A in a section according to FIG. 2B.
Figure 2A:
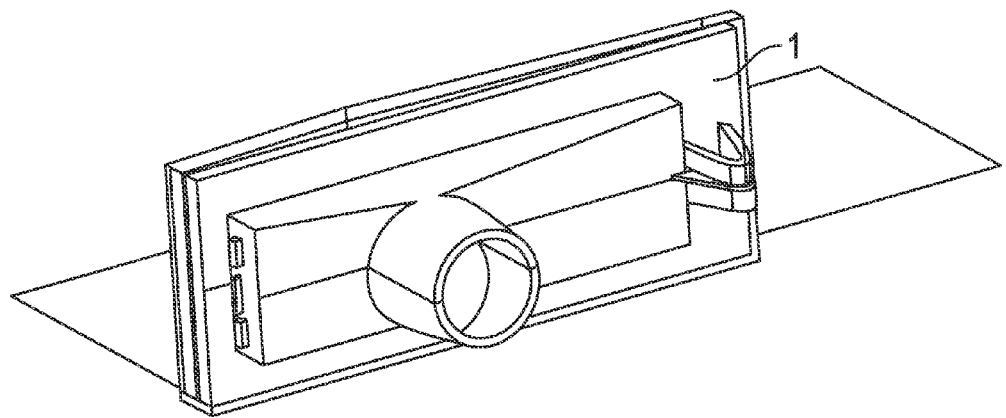
FIG. 2A is the additional turn signal lamp according to FIG. 1A in perspective view.
Figure 2B:
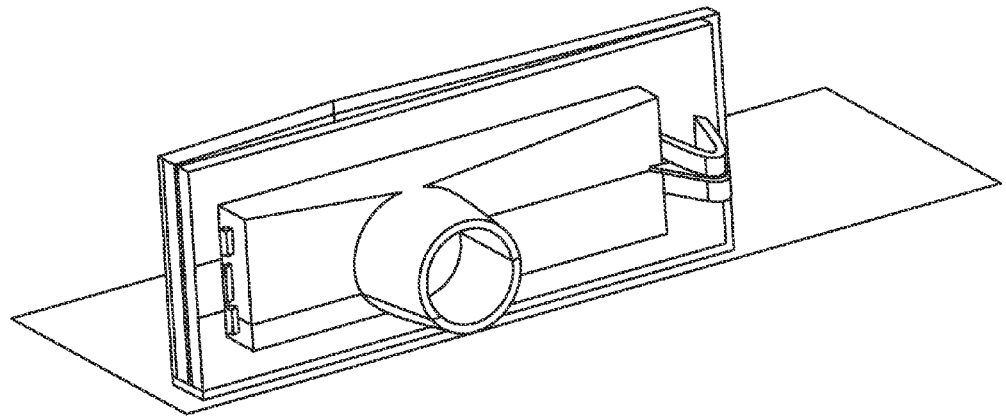
FIG. 2B is the additional turn signal lamp according to FIG. 1B in perspective view.
Figure 3:
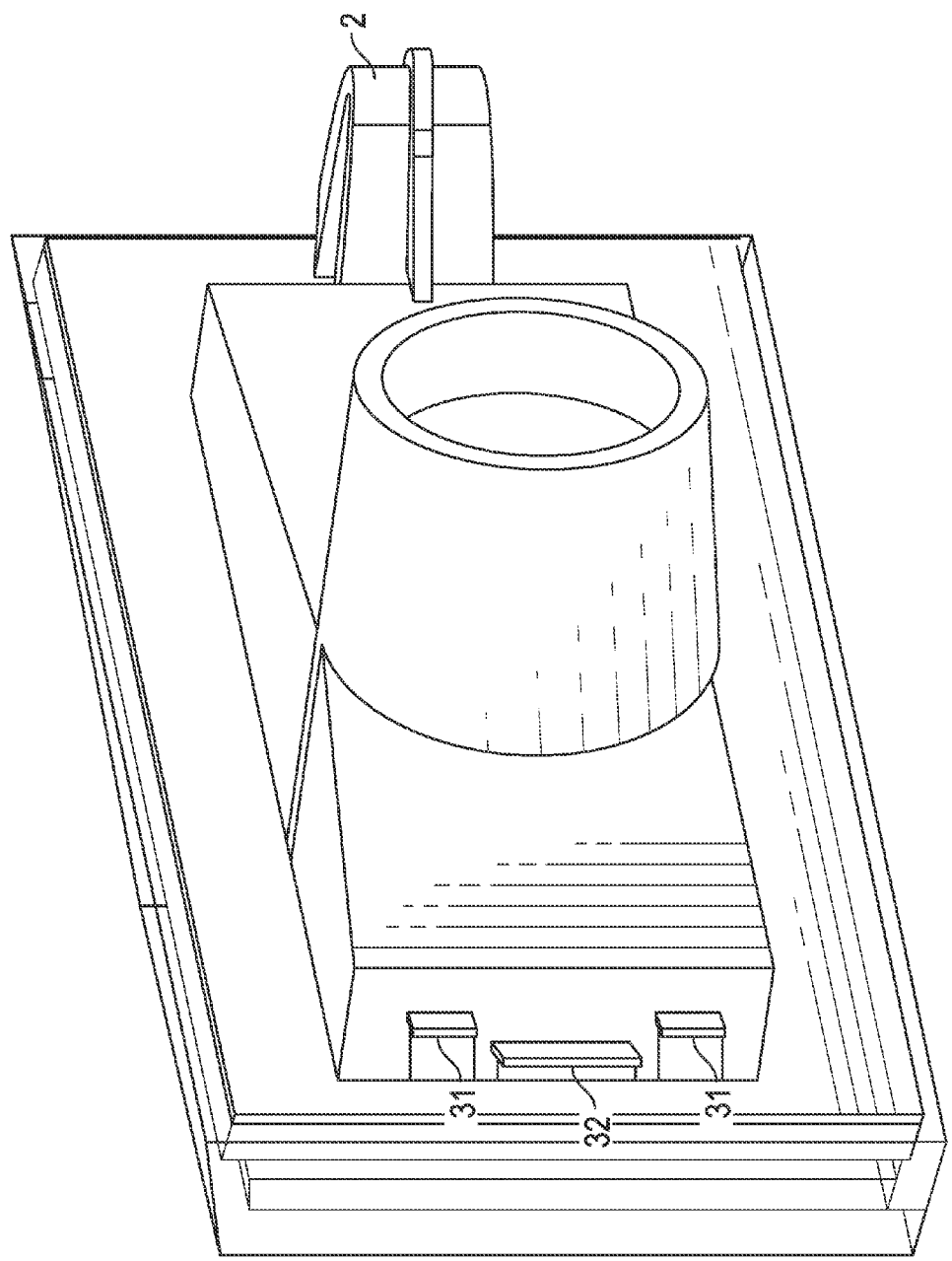
FIG. 3 the additional turn signal lamp according to FIGS. 2A, 2B in an enlarged perspective view.

FIGS. 2A, 2B and FIG. 3 show in perspective view a motor vehicle component according to an embodiment of the present invention in the form of an additional turn signal lamp 1, which in FIGS. 1A, 1B is shown mounted in sections corresponding to the sectional planes on motor vehicle supports indicated in FIGS. 2A, 2B in the form of fenders of a motor vehicle according to an embodiment.

Figure 4:
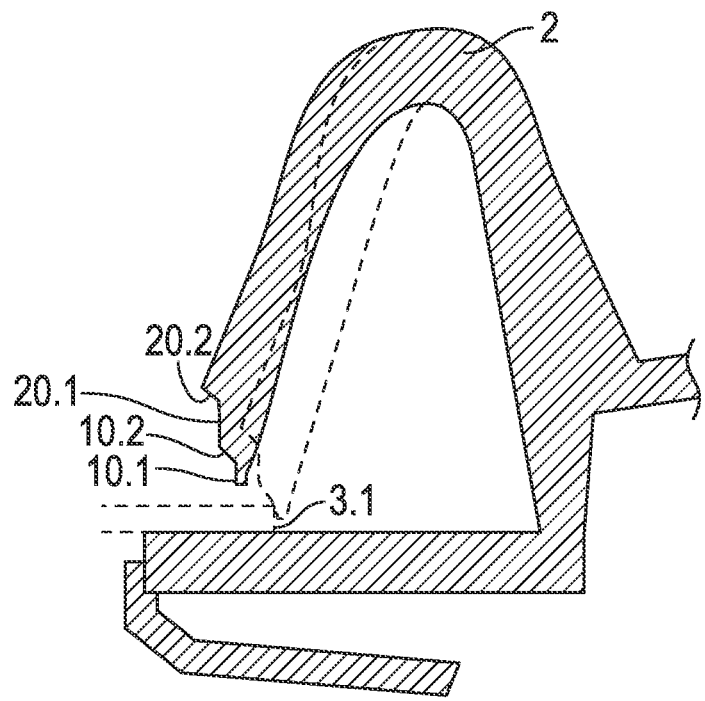
FIG. 4 is the clip of the additional turn signal lamp according to FIG. 3 in an enlarged section.

The additional turn signal lamp 1 comprises a clip 2 with U-shaped cross section and two legs, which as is evident in particular in the enlarged section of FIG. 4, comprises a first mounting face having a first friction face 10.1 and a first stop face 10.2 which is angled with respect to the former, which is provided for mounting to an edge 3.1 of a fender of sheet metal having a first wall thickness of approximately 0.7 mm. The clip 2 comprises a further second mounting face which is stepped with respect to this with a second friction face 20.1 and a second stop face 20.2 which is angled with respect to this, which is provided for mounting to an edge 3.2 of a fender of plastic having a second wall thickness of approximately 2.7 mm which is different from this (see FIGS. 1A, 1B). The first and second stop face 10.2, 20.2 are offset with respect to one another in an insertion direction (vertically upwards in FIGS. 1A, 1B), the first and second friction face 10.1, 20.1 in a direction perpendicularly thereto (horizontal in FIGS. 1A, 1B).

Mounting to the opposite edge, the additional turn signal lamp 1 comprises an abutment arrangement having a first mounting face 31, which is provided for mounting to an edge 4.1 having the first wall thickness, and a second mounting face 32 which is stepped with respect to this, which is provided for mounting to an edge 4.2 having a second wall thickness. As is evident in particular in the enlarged perspective view of FIG. 3, the first mounting face 31 and the two-part second mounting face 32 of the abutment arrangement are laterally offset with respect to one another. Like the mounting faces of the clip 2, the mounting faces 31, 32 of the abutment arrangement each have a friction face and a stop face which is angled with respect to this, wherein in the figures the stop face is respectively marked with the reference number 31 and 32.

In an insertion or release direction, vertically upwards or downwards in FIGS. 1A, 1B) located opposite the mounting faces 10.2, 20.2, 31 and 32, the additional turn signal lamp 1 has a counterface 5 and 6 each for abutment against the edge 3.1, 3.2, 4.1 and 4.2 of the fender.

Figure 5:
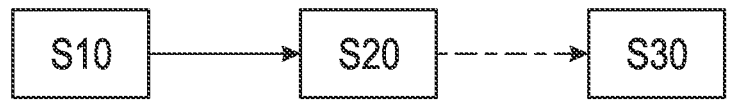
FIG. 5 is a method for mounting the additional turn signal lamp to the fender of FIGS. 1A, 1B.

For mounting the additional turn signal lamp 1 to the metal fender having a thinner wall thickness (see FIG. 1A), the mounting face, in particular stop face 31 of the abutment arrangement is initially hooked in on the edge 4.1. The additional turn signal lamp 1 is then pivoted about this abutment arrangement, so that the clip 2 subject to elastic deformation is inserted through the edge 3.1 (see FIG. 5: step S10). In the process, the stop face 10.2 of the first mounting face of the clip engages behind this edge 3.1. Simultaneously the inner face of the edge contacts the friction face 10.1 of the first mounting face of the clip 2 in a frictionally connected manner, thus bracing the additional turn signal lamp 1 in the plane of the edges 3.1, 4.1 of the fender. In this way, the clip 2 is clipped together with the edge 3.1 (see FIG. 5: step S20) and the additional turn signal lamp 1, through the friction faces of the mounting faces of the clip and the abutment arrangement—is mounted in a frictionally connected manner to the edges 3.1, 4.1 of the fender and simultaneously locked or mounted in a positively connected manner through the stop faces of the mounting faces of the clip and of the abutment arrangement.

For mounting the additional turn signal lamp 1 to the plastic fender having a thicker wall thickness (see FIG. 1B), the mounting face, in particular stop face 32 of the abutment arrangement is initially hooked in on the edge 4.2. In the process, the stop face 31 that is stepped with respect to this engages in a recess in the edge 4.2, which is provided for receiving this mounting face 31. The additional turn signal lamp 1 is then pivoted about this abutment arrangement, so that the clip 2 subject to elastic deformation is inserted through the edge 3.2 (see FIG. 5: step S10). In the process, the stop face 20.2 of the second mounting face of the clip now engages behind this edge 3.2. The inner face of the edge contacts the friction face 20.1 of the second mounting face of the clip 2 in a frictionally connected manner, thus bracing the additional turn signal lamp 1 in the plane of the edges 3.2, 4.2 of the fender. In this way, the clip 2 is clipped together with the edge 3.2 (see FIG. 5: step S20) and the additional turn signal lamp 1, through the friction faces of the mounting faces of the clips and the abutment arrangement, is mounted on the edges 3.2, 4.2 of the fender in a frictionally connected manner and simultaneously positively locked or mounted through the stop faces of the mounting faces of the clip and of the abutment arrangement.

In this way, the same additional turn signal lamp 1 can be optionally mounted on the metal fender having a thinner wall thickness or the plastic fender having a thicker wall thickness. It is evident that a clear width, measured in insertion direction (vertical in FIGS. 1A, 1B) between the counterface 5 and 6 and the first stop face 10.2 of the clip 2 or the stop face of the first mounting face 31 of the abutment arrangement is smaller than a clear width between this counterface 5 and 6 respectively and the second stop face 20.2 of the clip 2 and of the stop face of the second mounting face 32 of the abutment arrangement respectively. In particular through this stepping, the mounting faces 10.2, 20.2 and 31, 32 respectively are provided or equipped for mounting to edges 3.1, 3.2 and 4.1, 4.2 respectively.

The stop faces of clips and abutment arrangement which are angled with respect to the friction faces are beveled or arrow-shaped in the release direction through the angling. On the one hand, this facilitates the hooking in of the abutment arrangement and the pivoting of the additional turn signal lamp 1 about this abutment arrangement. On the other hand, it can center the additional turn signal lamp 1 between the edges 3.1, 4.1 and 3.2, 4.2 respectively, bracing it against the counterfaces 5, 6.

Advantageously, it also makes possible releasing the mounting: if in a step S30 (see FIG. 5) an adequately great disassembly force, which is greater than loads on the additional turn signal lamp 1 that occur during operation is imposed on this in release direction, the additional turn signal lamp 1 slides out of the edges 3.1, 4.1 and 3.2, 4.2 respectively (vertically down in FIGS. 1A, 1B) subject to elastic deformation of the clip 2.

The elastically deformed clip 2 mounted on the edge 3.1 of the metal fender having a thinner wall thickness is drawn in in FIG. 4 in dash-dotted line for illustration. It is evident that the clip is equally mounted through frictional connection through the contact with the first friction face 10.1 as well as positively mounted through the first stop face 10.2. In a modification which is not shown, the clip can also be mounted to the respective edge only through frictional or only positive connection.

Although in the preceding description exemplary embodiments were explained, it is pointed out that a multiplicity of modifications is possible. Thus, for example instead of the abutment arrangement, a further clip is alternatively provided corresponding to the clip 2. Additionally or alternatively, a further clip and a further clip bracing this against the former or a further abutment arrangement bracing this against the former can be provided in order to brace the turn signal lamp 1 between edges of the fender in a further direction, for example top and bottom in FIGS. 2A, 2B and 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle component, comprising:
   a clip for mounting to a first edge of a motor vehicle support;

the clip comprises a first mounting face for mounting to the first edge having a first wall thickness and a second mounting face that is stepped for mounting to the first edge having a second wall thickness; the second wall thickness being different from the first wall thickness; and a rigid abutment arrangement with a third mounting face for mounting to a second edge of the motor vehicle support having the third wall thickness and a fourth mounting face for mounting to the second edge having the fourth wall thickness, the fourth wall thickness being different from the third wall thickness, wherein the third mounting face and the fourth mounting face are laterally offset from one another and rigid relative to one another and the second edge.

2. The motor vehicle component according to claim 1, the first wall thickness is approximately equal to the third wall thickness, and the second wall thickness is approximately equal to the fourth wall thickness.

3. The motor vehicle component according to claim 1, wherein each of the first and second mounting faces comprises a stop face for the positive mounting and a friction face for a frictionally connected mounting.

4. The motor vehicle component according to claim 3, wherein the stop face is a beveled face that is beveled in a release direction relative to the mounting of the clip to the first edge of the motor vehicle support.

5. The motor vehicle component according to claim 1, further comprising a first counter-face for abutment against the first edge of the motor vehicle support.

6. The motor vehicle component according to claim 1, wherein the first wall thickness is smaller than approximately 1.5 mm and the second wall thickness is greater than approximately 1.5 mm.

7. The motor vehicle component according to claim 1, wherein the clip comprises at least one at least substantially U-shaped cross section having two legs,
wherein the first mounting face and the second mounting face are arranged on a leg.

8. The motor vehicle component according to claim 1, wherein the motor vehicle component is a turn signal lamp.

9. The motor vehicle component according to claim 1, wherein the motor vehicle support is a motor vehicle fender.

10. The motor vehicle component according to claim 1, wherein the first wall thickness is smaller than approximately 2 mm and the second wall thickness is greater than approximately 2 mm.

11. The motor vehicle component according to claim 1, wherein the first wall thickness is smaller than approximately 1 mm and the second wall thickness is greater than approximately 2 mm.

12. The motor vehicle component according to claim 1, wherein the rigid abutment arrangement has a fifth mounting face generally coplanar with the third mounting face for mounting to the second edge of the motor vehicle support having the third wall thickness, and wherein the fifth mounting face is positioned on a first lateral side of the fourth mounting face and the third mounting face is positioned on a second lateral side of the fourth mounting face.

13. The motor vehicle component according to claim 1, wherein the third and fourth mounting faces extend in a direction perpendicular to a thickness dimension of the second edge of the motor vehicle support.

14. A motor vehicle support, comprising:
a first edge and a second edge for mounting a motor vehicle component,
the motor vehicle component comprising a clip for mounting to the first and second edges of the motor vehicle support, wherein the first and second edges have a first wall thickness or the first and second edges have a second wall thickness, the first wall thickness being different than the second wall thickness;
the clip comprising a first mounting face for mounting to the first edge having the first wall thickness; and
the clip further comprising a second mounting face that is stepped for mounting to the second edge having the second wall thickness,
the motor vehicle component further comprising a rigid abutment arrangement with a third mounting face for mounting to the second edge of the motor vehicle support having the first wall thickness and a fourth mounting face for mounting to the second edge having the second wall thickness, wherein the third mounting face and the fourth mounting face are laterally offset from one another and rigid relative to one another and the second edge,
wherein the second edge comprises a recess for receiving the third mounting face of the abutment arrangement of the motor vehicle component.

15. The motor vehicle support according to claim 14, wherein the fourth mounting face is stepped.

16. The motor vehicle support according to claim 15, wherein the first mounting face comprises a stop face for the positive mounting and a friction face for a frictionally connected mounting.

17. The motor vehicle support according to claim 16, wherein the stop face is a beveled face.

18. The motor vehicle support according to claim 15, wherein the motor vehicle component further comprises at least one counter-face for abutment against the first edge.

19. The motor vehicle support according to claim 14, wherein the first wall thickness is smaller than approximately 1.5 mm and the second wall thickness is greater than approximately 1.5 mm.

20. The motor vehicle support according to claim 14, wherein the clip comprises at least one at least substantially U-shaped cross section having two legs,
wherein the first mounting face and the second mounting face are arranged on a leg.

* * * * *